United States Patent [19]

Shachar

[11] Patent Number: 5,923,736
[45] Date of Patent: Jul. 13, 1999

[54] HYPERTEXT MARKUP LANGUAGE BASED TELEPHONE APPARATUS

[75] Inventor: Yuval Shachar, Herzlia, Israel

[73] Assignee: National Semiconductor Corporation, Santa Clara, Calif.

[21] Appl. No.: 08/626,418

[22] Filed: Apr. 2, 1996

[51] Int. Cl.$^6$ .................................................. H04M 11/00
[52] U.S. Cl. .................................. 379/93.17; 379/93.25; 379/93.19; 379/110.01; 379/90.01; 379/93.07
[58] Field of Search ............................. 379/93.17, 93.19, 379/93.23, 93.24, 93.25, 110.01, 90.01, 93.01, 93.05, 93.06, 93.08, 88.01, 88.03; 707/513, 500, 501

[56] References Cited

U.S. PATENT DOCUMENTS

| 5,305,195 | 4/1994 | Murphy . | |
|---|---|---|---|
| 5,309,506 | 5/1994 | Alexander . | |
| 5,327,554 | 7/1994 | Palazzi, III et al. . | |
| 5,379,340 | 1/1995 | Overend et al. . | |
| 5,526,411 | 6/1996 | Krieter | 379/110.01 |
| 5,572,572 | 11/1996 | Kawan et al. | 379/110.01 |
| 5,572,643 | 11/1996 | Judson | 379/89 |
| 5,600,781 | 2/1997 | Root et al. | 345/142 |

OTHER PUBLICATIONS

TransPhone news releases on Business Wire, Jan. 1996.

*Primary Examiner*—Stella Woo
*Attorney, Agent, or Firm*—Limbach & Limbach L.L.P.

[57] ABSTRACT

An integrated telephone/terminal device for performing telephone and data communications functions is described. The telephone/terminal device includes a display screen, input device, telephone interface, data communications interface (e.g., modem), a processor and memory. A hypertext markup language interpreter resident within the telephone/terminal device provides the basis of a hypertext based GUI. Resident hypertext documents stored within the memory of the device control user interface to essential functions such as setup and configuration, dialing, data access, etc. One aspect of the invention is directed to using HTML and TCP/IP (Internet "World Wide Web" compatible interpreter and protocols) to provide seamless access to Internet-hosted hypertext documents in a device which requires no computer training or expertise of the user thereof.

11 Claims, 8 Drawing Sheets

HYPERTEXT MARKUP LANGUAGE BASED TELEPHONE APPARATUS

TECHNICAL FIELD OF THE INVENTION

The invention relates to data communication networks and, more particularly, to techniques for interactively transferring information over data communication networks.

BACKGROUND OF THE INVENTION

For nearly as long as there have been computers, there has been a need to exchange information between computers. One method for accomplishing this has been through the use of data communication networks. Data communication networks have been provided in a wide variety of different forms, for a variety of different purposes. For example, a corporation might employ a local-area network (LAN) to permit a number of computers at a particular site to exchange and/or share data. Each computer is provided with a LAN interface and communicates with the other computers over the LAN. LANs can be either wired or wireless. Some examples of LANs in common use today are token-ring networks, Ethernet networks, and spread-spectrum radio networks.

By way of further example, if the same corporation wished to link more widely separated computers or to cross-connect several LANs, a wide-area-network (WAN) might be employed. WAN's can also be wired or wireless, employing such diverse communication media as leased telephone lines, dedicated cable, satellite channels, microwave communications, and fiber-optics.

In recent years, other commercially-provided data communication network options have become available. On-line services provide dial-up communications with such commercial networks. Service providers charge a fee for the use of these commercial networks, for providing database services, for enabling access to other networks, and for providing communications between users of the networks. Electronic mail (E-Mail) facilities are often provided whereby a user of a data communications network can post a message for another user to be picked up at a later time. Compuserve™, Delphi™, America Online™, Prodigy™, and Genie™ are examples of such on-line service providers. Generally, the on-line services are accessed by using a modem to connect to the service provider over the public switched telephone network (PSTN). The PSTN is a network, too, but unlike the data communication networks the PSTN is designed primarily to support voice communication.

Some manufacturers have integrated data communication features and voice communications into a more familiar telephone-like device. These devices, which are gradually coming into use, are commonly known as "screen phones", and can be distinguished from conventional telephones by the presence of various distinguishing features such as a display screen, non-telephone function buttons, an integrated modem, enhanced calling capabilities, and a variety of others. Currently, screen phones are sold as part of a screen phone system which includes a central computer and proprietary operating software. At the present time, very few services are available for access by screen phones and, therefore, the cost of a screen phone cannot be justified by many prospective users. Accordingly, the installed base of screen phones is relatively small. The small installed base, in turn, limits vendors' interest in providing screen phone services.

Screen phones are in use in several areas of the world with the most successful application, known as "Minitel", being in France. These screen phones utilize a totally proprietary computer network and protocol, and have services specifically designed therefor.

An emerging communications medium called Integrated Services Digital Network (ISDN) combines some of the characteristics of data and voice communications networks into a single connection. ISDN permits simultaneous voice and data communications over a single ISDN line by breaking ISDN communications into two "B" channels and one "D" channel. The "D" channel is intended primarily for signalling, while the two "B" channels, which operate at much higher data rates, are intended to carry digital voice and data communications information.

Among the larger and better known data communication networks is "Internet". Internet is an outgrowth of a United States government research project (known as ARPANET, for Advanced Research Projects Agency Network) begun in the 1960's. It was originally used by colleges, universities and the government for research and development purposes. It has since evolved to become a "network of networks" covering a large portion of the commercial business sector. Today, the Internet's 30 million-plus users are connected by over 45,000 public and private networks (over 4 million host computers), reaching more than 140 countries around the world.

Internet is governed by a set of standardized protocols and access procedures by which any Internet "node" (a computer connected to Internet to which a "node address" has been assigned and to/through which data communication may occur) can communicate with any other Internet node. Generally speaking, Internet users must have a computer and either direct or dial-up access to an Internet node in order to communicate via Internet. Many commercial enterprises and educational institutions, world-wide, are connected to Internet.

A dial-up connection to a data communication network operating in conjunction with a packet-voice capability can be used to provide voice and data communications across Internet. VOCALTEC is currently providing software for permitting packet voice conversations over Internet, using conventional computer sound cards and microphones for voice input and output. Two similarly equipped computers can be used to provide telephone-like conversations across Internet in this way.

As commercial data communications networks have grown, numerous general-user features have been added to make them more attractive to a wider base of users. For example, most on-line services provide information databases for accessing news and financial reports, weather forecasts, on-line shopping services, directory services (e.g., user directories) and special-interest databases (e.g., music, arts, technical, scientific, literature, reference materials, etc.).

Over the last few years, several commercial data communications networks (perhaps most notably Internet), have been employing "hypertext" which is an interconnected web of associated information throughout a network. The information can include text, images, sound and/or animation. The implementation of hypertext involves the preparation and storage in memory, with uniquely assigned addresses, of hypertext documents. A hypertext document, when referred to herein, can mean a file of data stored in computer memory and addressable, or it can mean the visible display of that data to the user on a screen, depending on the context.

Each hypertext document is written in a suitable computer language. One such language is HTML (for Hyper Text Markup Language). A thorough treatment of what HTML is and how it can be used is available in Graham, "HTML Source Book", ISBN 0471118494 by John Wiley & Sons, Inc., which is hereby incorporated by reference.

A hypertext document can be made up of data related to text, linked markup elements and anchors. The data stored in a hypertext document file is processed by a hypertext markup language interpreter, such as a "browser" program. When the browser processes the text data, that data will be used to format and display the text on a screen. A linked markup element provides the browser with an address of another stored file and an action to be taken with the data at that address. For example, a linked markup element can point to a graphical company logo. While scanning the entire document, the browser will reach the marking element, proceed to the specified address of the data associated with the logo, retrieve the data, create the graphical image and display it on the screen, all in accordance with the linked markup element. An anchor is the address of another hypertext document in the interconnected hypertext web, and a representation of that document. For example, the representation might be "on-line documents". When the browser reaches this anchor, it will display the representation on the screen as, for example, the text "on-line documents" appearing in a highlighted manner. This displayed image of the highlighted text is known as a hyperlink. Thus, a hyperlink can be considered as being the visible depiction of an anchor. The user has the option, at any time, of selecting any of the hyperlinks displayed on the screen with a suitable input device, e.g. a keyboard or mouse. When a hyperlink is selected, the browser accesses the address stored in the anchor represented by the hyperlink, retrieves the hypertext document stored at that address, and displays it on the screen. Thus, in our example, a list of documents available on line, perhaps with its own hyperlinks, will be displayed. It should be noted that the terms "hyperlinked" and "hypertext-based" are used synonymously herein.

The associated information interconnected via hyperlinks in the above-described manner is often described as a "world-wide-web". This "web", also commonly designated by "WWW", is developing in a manner which is geared to computer-based access by users who own a personal computer ("PC"). Many non-users regard access to the information in the "web" as being highly desirable. However, use of the "web" can be intimidating and uninviting to those who are relatively less computer-literate.

Expanding upon this general theme, a major problem with many data communication networks is that they are designed for computer users. Due to the cumbersome and complicated nature of many computers and communications interface devices, this usually means that the use of data communication networks requires computer-literacy. Because many potential data communication users who would otherwise find data communication network features to be useful could not be described as being computer-literate, these data-communication networks are often under-utilized.

The following terms are used in the discussion that follows:

User—one who is interested in purchasing goods/services.

Access Provider—an entity who (that) provides access to a data communication network such as Internet. Such an entity can be an on-line service such as Compuserve, a phone company, or a direct access provider, such as Netcom.

Service Provider—a vendor of goods and/or services.

U.S. Pat. No. 5,305,195, entitled "INTERACTIVE ADVERTISING SYSTEM FOR ONLINE TERMINALS" describes an interactive system for displaying advertising information from a remote central computer to terminals capable of displaying full motion video. Using a touchscreen, the user selects the service or goods desired. When a selection is made, and while waiting for the system to respond, a video clip of an advertisement (commercial), such as up to 15 seconds in duration, is displayed. The content of the video commercial is sent from a remote computer and loaded onto the non-volatile memory, such as hard disk, of the terminal.

U.S. Pat. No. 5,379,340, entitled "TEXT COMMUNICATION SYSTEM", describes a communication system in which text is sent from one terminal to another, and an indication of reception by the remote terminal is generated to the sending terminal. This allows the sending terminal to attempt retransmission in case of failure to receive by the receiving terminal. The system works unattended. The system also checks that the text is received accurately.

U.S. Pat. No. 5,309,506, entitled "PERSONAL SERVICES TELEPHONE HANDSET AND SYSTEM" describes a telephone handset with programmable pushbuttons. The number of pushbuttons is fixed, but their function can change as the interaction with the service provider is established. Only numeral information is provided for by this technique, which is primarily directed to sending information from a user site to a remote site, rather than interactively locating information at a remote site and retrieving it for usage at the user site.

U.S. Pat. No. 5,327,554, entitled "INTERACTIVE TERMINAL FOR THE ACCESS OF REMOTE DATABASE INFORMATION," describes a terminal which supports retrieval of information from a remote location. It is focused on using devices commonly available in homes, such as the telephone and its keypad as an input device, and a television set as a display device. In some embodiments, a general purpose keyboard may be employed. All interaction with the remote database is accomplished through inputs from the fixed keyboard or keypad available on the telephone.

PC-based "Web Browser" programs, such as "Mosaic" and "Netscape", have become available and have seen increasing use over the past year or so. These programs are graphical user interface browsers which allow the PC user to connect into and utilize Internet's hypertext "World Wide Web". The software is installed on a PC and uses a modem to connect to an Internet service provider. Much of the functionality of these Web Browser programs relies upon the services available with the computer's operating system (e.g. Microsoft Windows). An operating system, also referred to as "OS", is a well known term used to denote a computer program which, for example, manages the hardware resources, and provides various services (such as inter-process communication, file and directory systems, data transfer over networks, and a command language for invoking and controlling programs). An OS also hides from the user the primitive facilities of the base computer, such as interrupts, status registers and device interfaces. The OS is builds its high-level services by wrapping the low-level hardware facilities in layers of software, resulting in a machine that is much easier to use than the bare hardware. Thus, the virtual machine visible to the user is only the outermost of a series of software layers refining the bare hardware. Perhaps the most influential current operating system is UNIX.

Generally speaking, widespread access to and use of online services by the general public is inhibited by several significant factors:

1) Most computer-based online services require some degree of computer literacy. Many people are quite intimidated by computers and shy away from using online services which require an understanding of modem features and perhaps a capability for installing a modem in terms of its hardware and software.

2) In order to access most online services, a computer is required. Even if the computer literacy problem is eliminated, most computers are still too expensive to be considered a commodity item by the general public, and provide more capabilities than are required just for access to online services.

3) Current screen-phone-based systems (e.g. Minitel mentioned above), which address the problems of cost and computer literacy reasonably well, fail to succeed because of the enormous infrastructure (network, software, service providers and services) required to support their function.

Evidently, there is a need for a low-cost means of providing on-line services to the general public without a need for computer literacy or a large, new infrastructure.

SUMMARY OF THE INVENTION

It is an object of the present invention to provide a technique for navigating and accessing hyperlinked (hypertext) information on a data communications network which requires little or no computer expertise.

It is a further object of the present invention to provide a technique for navigating and accessing hyperlinked information on a data communications network which does not require a proprietary infrastructure.

It is a further object of the present invention to provide a technique for navigating and accessing hyperlinked information on a data communications network which is compatible with existing networks and data structures.

It is a further object of the present invention to provide a technique for navigating and accessing hyperlinked information on a data communications network which is inexpensive compared to personal computer-based systems.

It is a further object of the present invention to accomplish the foregoing objects in the form of a telephone/terminal device with an integrated display screen.

It is a further object of the present invention to provide an integrated telephone/terminal device which is capable of browsing Internet "Web" documents.

It is a further object of the present invention to merge hyperlinked data with voice features and the telephone network.

According to an aspect of the invention, an integrated telephone/terminal device for navigating hyperlinked documents on a data communications network comprises a voice communications interface (e.g., a telephone), a data communications interface (e.g., a modem and protocol software to support data communications with a data communications network), memory, a display screen, an input device (e.g., a touch screen), a processor, and a hypertext markup language interpreter. The processor receives user input and commands (e.g., keypad or keyboard button depression, mouse clicks, etc.) from the input device, and produces displayable output on the display device, with which the user interacts via a hypertext markup language interpreter.

According to an aspect of the invention, the hypertext markup language can be HTML, which is the language used on Internet for the "World Wide Web" hypertext documents.

The hypertext markup language interpreter is used as the basis of a graphical user interface (GUI) for the telephone/terminal device. A set of resident hypertext documents stored in the memory of the telephone/terminal device provide the basic user interface therefor. These resident hypertext documents include a "home page" for the telephone/terminal device, and as many other resident documents as are necessary to provide user access to essential functions, such as setup and configuration, and control over voice and data communications functions (dialing, caller-ID, speakerphone functions, network access, etc.). In this sense, use of the resident hypertext-based documents constitutes the user-level layer of a hypertext operating system (in which the system-level layer parts are responsible for retrieval and handling of hypertext documents). This operating system runs operation of the telephone/terminal device as regards, for example, the data communications network.

The technique of using a hypertext-based operating system for providing a GUI as one of its services is in contrast with conventional techniques for navigating hypertext information in that conventional systems add hypertext capabilities, e.g. a browser like "Mosaic", on top of a non-hypertext GUI program, e.g. Windows, for the explicit purpose of browsing hypertext information. In conventional systems, hypertext functionality is not applied to basic GUI and machine functionality. By way of contrast, the present inventive technique uses hyperlinked hypertext documents as the basis of a GUI, such that hypertext is a "native" capability of the operating system, rather than an add-on capability.

The input device can include one or more from among multiple input peripheral devices, such as a keyboard, numeric keypad, mouse, touch pad, touch screen, joystick, voice recognition, handwriting recognition, etc. Any suitable input peripheral device for interacting with the processor can be accommodated. The display device must have at least minimal graphical display capabilities, as dictated by specific needs of the hypertext based GUI.

According to another aspect of the invention, the protocol software can be TCP/IP (described below), which is known to those of ordinary skill in the art as the standard is protocol for accessing the Internet.

By using HTML and TCP/IP in the telephone/terminal device of the present invention, it becomes possible to "seamlessly" browse the "World Wide Web", that is, since HTML is a "native" capability and Internet addressing is known to the telephone/terminal device by way of TCP/IP, it is only necessary to include a reference to a "Web" document within the GUI of the terminal device to permit it to be accessed by a user. This technique requires no training or computer expertise of the user because it does not involve running application programs, configuring a modem, going on-line, using a mouse, and overcoming various other technophobe barriers.

According to an aspect of the invention, the voice communications interface can include a telephone handset, a speakerphone, or both.

Other objects, features and advantages of the present invention will become evident in light of the following description thereof.

BRIEF DESCRIPTION OF THE DRAWINGS

Reference will be made to preferred embodiments of the invention, examples of which are illustrated in the accompanying drawings. Although the invention will be described in the context of these preferred embodiments, it should be understood that such description is not intended to limit the spirit and scope of the invention to these particular embodiments.

DETAILED DESCRIPTION OF THE INVENTION

The present invention is related to navigating between information stored in the nodes of a data communication network. This is accomplished via a hypertext markup language based GUI by which a user selects (e.g., by touching a touch-sensitive screen) a hyperlink displayed on a display screen of a telephone/terminal device to effect a desired action. Unlike "conventional" personal computer-based devices, the telephone/terminal device of the present invention requires little or no knowledge of computers (computer literacy).

Figure 1:
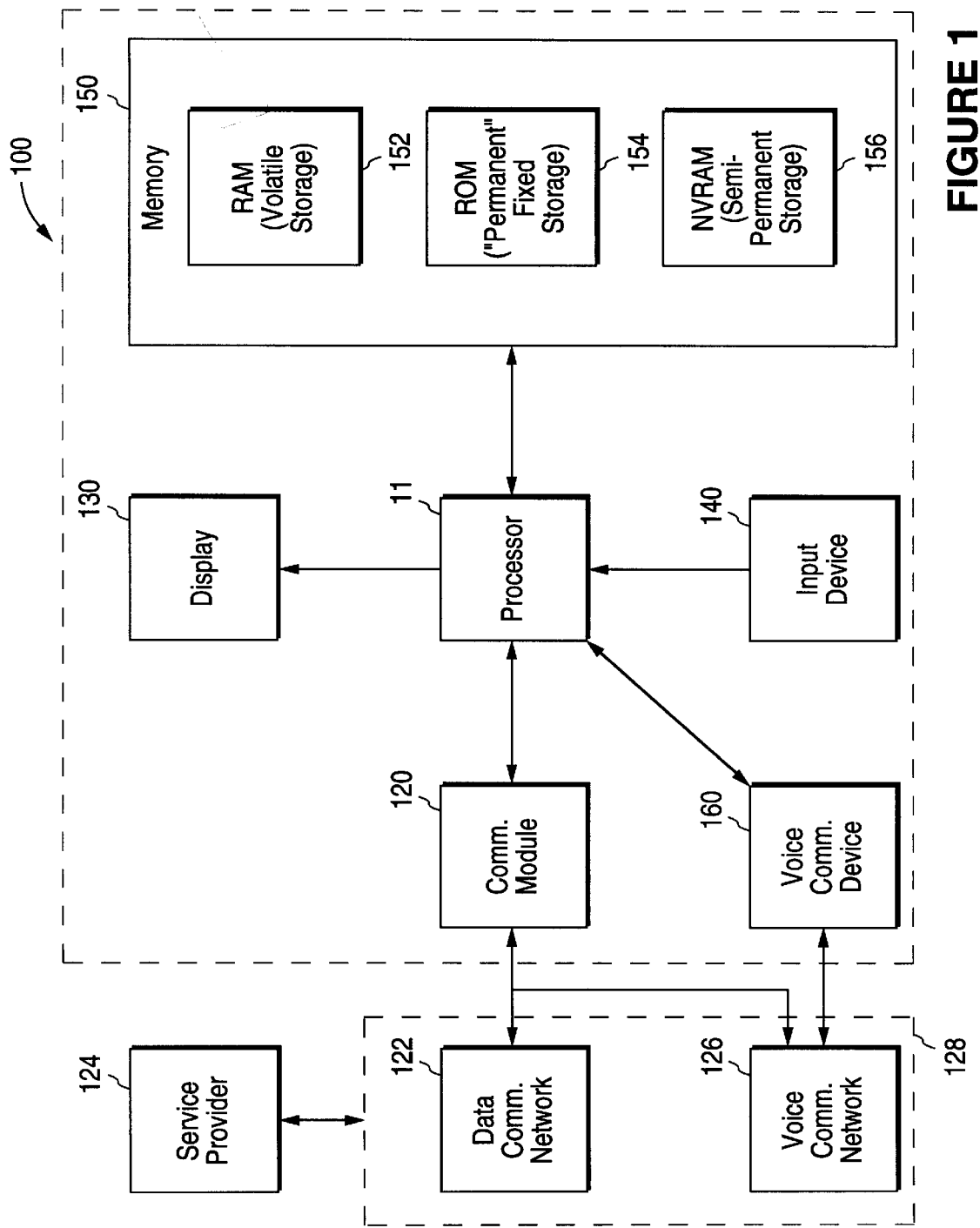
FIG. 1 is a block diagram of a hypertext markup language based telephone terminal device, according to the present invention.

FIG. 1 is a block diagram of a hypertext markup language based telephone/terminal device 100 having the capability of receiving, storing, and operating upon hypertext documents (e.g., hypertext "pages"), according to the present invention. The terminal includes a processor 119, a communications (COMM) module 120, a display device 130, an input device 140, memory 150 and a voice communication (COMM.) device 160. The processor 119 receives user inputs and commands (e.g., keypad or keyboard button depression, mouse clicks, etc.) from the input device 140, and produces a displayable output on the display device 130, with which the user interacts. Preferably, the processor operates according to a GUI whereby graphic images displayed on the display device 130 by the processor 119 can be selected and/or manipulated by the user with the input device 140. The input device 140 can include one or more from among multiple input peripheral devices, such as a keyboard, numeric keypad, mouse, touch pad, touch screen, joystick, etc. Any suitable input peripheral device for interacting with the processor 119 can be accommodated, even voice recognition and/or handwriting recognition can be used to provide or augment the input functionality of the telephone/terminal device 100. Similarly, the display device 130 can be an LCD screen, a CRT (cathode ray tube), a television set or any other suitable display peripheral device or combination of display peripheral devices and indicators. The display device 130 must have at least minimal graphical display capabilities, as dictated by specific needs of a hypertext based GUI, as presented in greater detail hereinbelow. Also, it can include a touch screen to facilitate selection of a displayed graphical "button", as discussed below.

The communications module 120 interfaces the processor 119 to a communications network 128. Preferably, the communication network 128 has both voice and data communication capabilities. Logically, however, the voice and data communications capabilities can be separated into a data communication network 122 and a voice communication network 126. The data communication network 122 permits access to one or more service providers 124. The voice communication network 126 provides telephone-like communication features whereby a voice (audible) conversation with another party, not shown, (presumably human, but possibly an automated voice response system) can be established.

The voice communication device 160 can either be integrated into the terminal 100, or operationally associated therewith. In the former case, the telephone/terminal device 100 would integrate at least some of the features of a telephone, such as a dialing keypad, a speaker, and a microphone. In the latter case, the voice communication device 160 could be provided as a separate telephone, for example, plugged into a bypass port of a modem. Preferably, however, the telephone/terminal device 100 is a single integrated unit incorporating an interactive display device such as a display screen with a touch screen overlay, a telephone handset or speakerphone interface to a voice communications network (such as a public switched telephone network), processor, memory, and a data communications interface (such as a modem).

By way of example, an ISDN connection can be used to provide both voice and data communications over a single network.

By way of further example, a dial-up connection to a data communication network operating in conjunction with a packet-voice capability can be used to provide voice and data communications. VOCALTEC is currently providing software for permitting packet voice conversations over Internet, as described above.

By way of further example, a dial-up connection to a data communication network can be used in conjunction with a separate telephone line for voice communication to provide simultaneous voice and data communications.

By way of further example, a single dial-up connection can be used for connection to a data communication network, then switched over to normal telephone use as required.

Optionally, the terminal can be operated without voice capability, by omitting those features which are specific to voice communication.

The processor 119 accesses the memory 150 in order to accomplish its various tasks. The memory 150 includes volatile storage 152 such as random access memory (RAM) for storing data on a temporary basis, "permanent" fixed storage 154 such as read-only memory (ROM) for storing program information to be executed by the processor 119, and non-volatile (NV) or semi-permanent storage (e.g., NVRAM or hard disk) for storing data which may be updated. (Although the program storage is referred to as "permanent", it will be readily understood by those of ordinary skill in the art that program data can be stored on a computer disk, or in re-writable "FLASH" memory which can be updated. It is generally only important that the program information be stored in a manner which is readily accessible to the processor 119 on an as-needed basis).

It is assumed, for purposes of this description (and elaborated upon in greater detail hereinbelow), that the device 100 has a "browser" functionality associated therewith. A "browser", as described above, is the instrumentality by which a user "navigates" information stored on a data communication network such as Internet. Such browsers recognize the formatting and link information stored with hyperlinked hypertext documents (described hereinabove) and generate appropriately formatted displays from data and formatting information contained in the document. Further, browsers are capable of retrieving and storing/displaying hyperlinked documents when a hyperlink is selected by a user (usually by selecting a highlighted image on a display screen, as explained above). The hypertext "browser" functionality is based upon a hypertext markup language such as HTML. Those of ordinary skill in the art are familiar with such browser functionalities and their capabilities.

Unlike conventional PC-based data communications devices which add hypertext capability on top of an existing general purpose OS and GUI such as Microsoft Windows, the telephone/terminal device 100 of the present invention uses a hypertext markup language, such as HTML, as the basis of its GUI. Every display generated by the device 100, even those produced upon initial power-up, are produced by executing a hypertext page description (i.e., a hypertext document) using the hypertext markup language. For functions which are essential to the operation of the telephone/terminal device 100 (e.g., dialing interface, setup and configuration, terminal options settings, network access, etc.) there are "resident" hypertext documents (or pages) stored within the memory 150 of the telephone/terminal device 100. When initially powered up or "reset," the telephone/terminal device 100 retrieves and executes a resident hypertext "home page" in a conventional manner.

The detailed structure of hypertext documents is dictated by the requirements of the specific hypertext language (e.g., HTML) which is employed by the telephone/terminal device 100 and the data communications network(s) to which it connects. Generally speaking, however, hypertext documents include text, linked markup elements and anchors, as explained above. When a hyperlink is selected, the designated hypertext document is retrieved (locally within the telephone/terminal device 100, if the document address is local, or from a data communications network node, if so indicated by the document address) and "executed". "Executing" a hypertext document involves reading the constituents of the hypertext document, performing action(s) called for by the linked markup element(s), displaying the hyperlinks corresponding to the anchors and waiting for the user to select a hyperlink. When the user selects a hyperlink, the address specified in the anchor corresponding thereto is accessed and the document is displayed. Actions called for by the linked markup elements can include "jumping" to another hypertext document, playing a sound or video clip, and executing a pre-defined procedure (e.g., modifying a setup parameter, dialing a telephone number or connecting to a network).

Under certain circumstances, it is desirable to define either a "NULL" hyperlink or a "NULL" action for a markup element. For example, when static text is displayed (e.g., screen labels, etc.) there is no action associated with them. By way of further example, some actions (e.g., an automatic playback of a sound clip), do not require a statically displayed graphical "button", unless they are to be invoked by user selection thereof.

Figure 2:
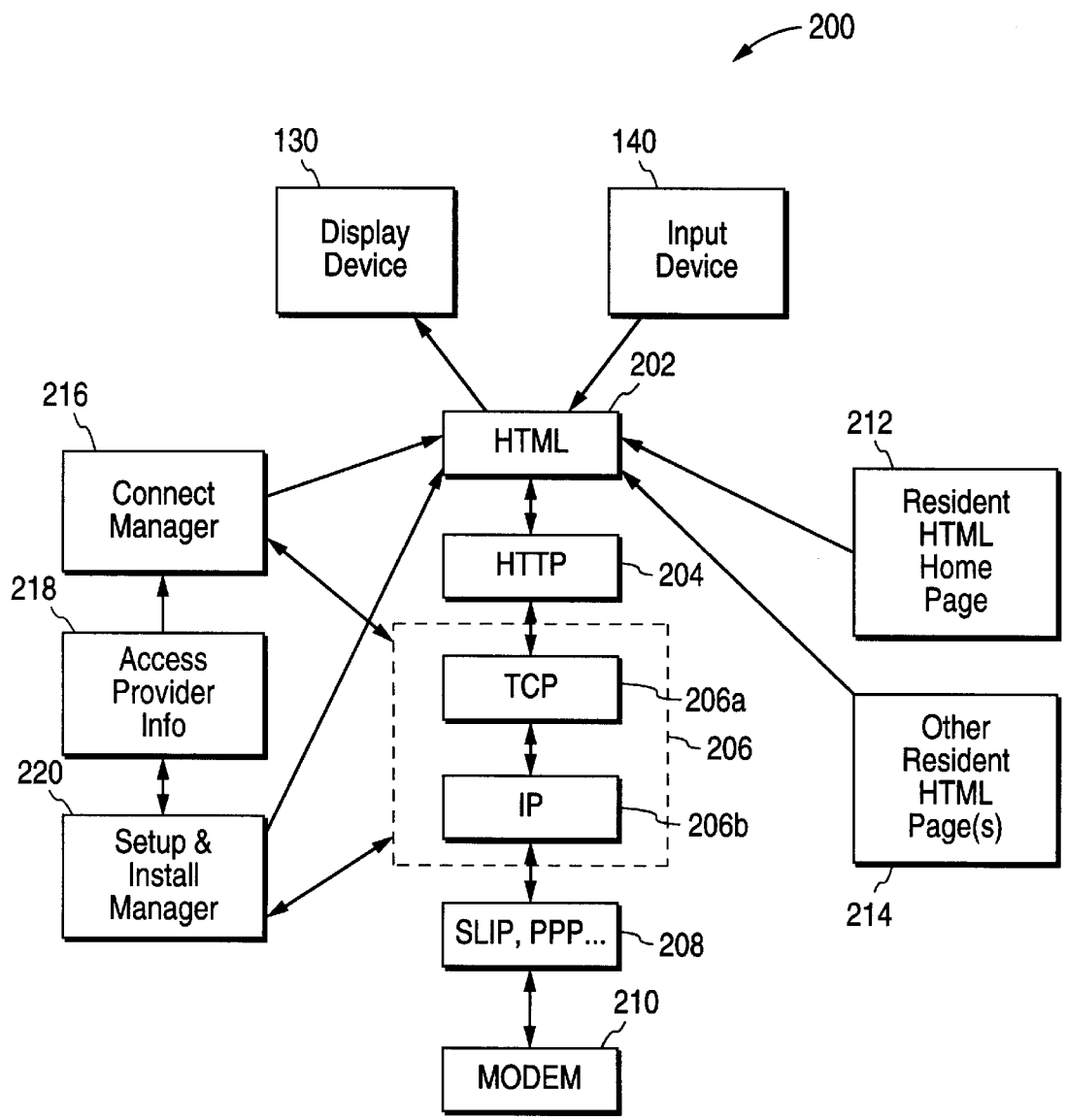
FIG. 2 is a block diagram showing data flow within a hypertext markup language based telephone device, according to the present invention.

FIG. 2 is a block diagram 200 showing data flow within an HTML based telephone device, according to the present invention. As shown in FIG. 2, the display device 130 and input device 140 (see FIG. 1) e.g., a touch screen/display combination, interact with a hypertext markup language 202 (HTML) to produce displays and act upon hyperlinks selected by a user thereof. A hypertext transport protocol 204 (HTTP) manages network access associated with hypertext markup language 202 data requests. The hypertext transport protocol 204 (HTTP) interacts with a protocol hierarchy 206 commonly referred to as TCP/IP, which comprises a Transmission Control Protocol 206a (TCP) and an Internet Protocol 206b (IP). This protocol hierarchy 206 (TCP/IP) is well known to those of ordinary skill in the art and will not be further elaborated upon herein. The TCP/IP protocol 206 interfaces with a subscriber line interface protocol 208 (e.g., SLIP, PPP) for dial-up network access, or to a suitable substitute low-level protocol for other types of access (e.g., network access via ISDN or other digital network access). In the case of a subscriber line interface protocol 208, access to a data communications network is accomplished via a modem 210. Those of ordinary skill in the art will immediately recognize that for other forms of network access, different hardware would be used to physically interface to the network, but that the functions are logically substantially identical, regardless of the specific interface technique.

The telephone/terminal device 100 has a resident hypertext "home page" document 212, discussed above, stored within its memory (see 150, FIG. 1 and associated description thereof). Other resident hypertext documents 214 are used to control local functions of the telephone/terminal device 100 such as setup and configuration, dialing, network access, etc. Hypertext documents 212 and 214 can typically be designed and stored by the manufacturer of telephone/terminal device 100 to be "user-friendly" and with clear instructions. How this can be done is readily apparent to one ordinarily skilled in the art and, therefore, no details are deemed necessary to be provided herein.

For the purposes of this specification, the term "resident" when used with respect to a document or program (e.g., hypertext page or interface protocol) means that the document or program is stored within the memory 150 of the telephone/terminal device 100. The HTML 202, the HTTP 204, the TCP/IP protocol hierarchy 206, and the subscriber line interface protocol 208 (or equivalent substitutes therefor) may all be "resident" within the telephone/terminal device 100, along with documents 212 and 214.

A connect manager function 216 determines whether a hypertext page address is resident or remote (i.e. on the network) and provides access provider information 218 in the form of phone number, access procedures, log-on passwords, etc., as required for accessing a data communications network. Since each access provider may have its own specific log-on sequence and access procedures, it is necessary that this information be reprogrammable within the telephone/terminal device 100. The access provider information 218 is updatable by a setup and install manager function 220. Upon initial startup (installation) of the telephone/terminal device 100, the resident HTML "home page" 212 is executed by processor 119 (FIG. 1). This causes the setup and install manager 220 to be executed (via a markup element in the home page) which, if it recognizes that there is no account information stored within the access provider information 218, begins creating a new account. This can be accomplished via direct interaction with the user (via the display device 130) whereby the user enters relevant account information via the input device 140. Alternatively, the setup and install manager 220 can create a new account automatically by dialing a pre-stored access number by which new account information can be automatically determined. (Automated setup of this type is currently employed by several commercial data networks such as Compuserve®, America On-Line® and Prodigy®).

If the telephone/terminal device 100 is moved from one geographical area to another, local access information related to data network access will no longer be valid. In this case, local account access information can be set up for several different locales. If a data network access attempt fails due to invalid account information, then a different local account is used. If no stored local account is valid, then the setup and install manager 220 begins setting up a new account.

Although the structure of the block diagram 200 and the foregoing description with respect thereto are directed primarily to the communications standards associated with the Internet "World Wide Web," those of ordinary skill in the art will immediately understand that any suitable alternative hypertext communications substructure associated with any suitable alternative network can be employed in much the same manner. For example, other known hypermedia schemes to which the invention can be applied are MHEG (standard ITU-T T.171), HyTime and HyperDoc.

Hypertext documents can contain markup elements which request a variety of different actions. For example, a hypertext document might contain a screen label describing where to call to talk to someone about a particular product or topic, e.g., "For further information call 1-800-123-4567", and would provide a graphical "button" hyperlink on the screen to automatically initiate the call by invoking a dialing procedure. Further, via a parallel data session and/or electronic mail, a service provider contacted in this manner can leave further information (e.g., additional hypertext document locations, specific messages, etc.). This permits direct interaction with a service provider via the telephone/terminal device 100.

The present invention accomplishes a number of objects not provided by the prior art or any combination thereof. For example:

In the system described by the aforementioned U.S. Pat. No. 5,305,195, the system responds with an advertisement as a result of the user requesting some action from the system. No specific interaction is possible. By way of contrast, in the present invention, hyperlinks are displayed on the screen and the user can interact directly with a service provider through the various features of the telephone/terminal device described hereinabove.

In the system described by the aforementioned U.S. Pat. No. 5,379,340, a secured text-based messaging system enables transfer of text between terminals. The text is sent from the sender regardless of the receiver's willingness to receive such information. The present invention operates differently, whereby information is sent only by explicit request. Moreover, the user has a multitude of options to communicate with the service provider which are neither suggested nor taught by the prior art. While U.S. Pat. No. 5,379,340 is limited to text information, the present invention provides for handling an image, for example, a logo.

The aforementioned U.S. Pat. No. 5,309,506, entitled "PERSONAL SERVICES TELEPHONE HANDSET AND SYSTEM" describes a telephone handset with programmable pushbuttons which are capable of providing only fixed, numeric information. Unlike this, the present invention includes means for displaying variable graphic information (e.g. button) as well as collecting information from remote sites, according to the specifications of sets of hypertext markup language documents.

By way of contrast with the aforementioned U.S. Pat. No. 5,327,554, entitled "INTERACTIVE TERMINAL FOR THE ACCESS OF REMOTE DATABASE INFORMATION," which describes a terminal that supports retrieval of information from a remote location, the present invention incorporates its own integrated display device and has much more sophisticated and flexible means of interacting with a data communications network.

FIGS. 3–11 are presented for the purpose of elaborating upon the above-presented description of the invention by presenting more details about its implementation and by comparing it with a conventional UNIX-like operating system. The invention has been described above in terms of one aspect thereof being in the nature of an operating system relying solely on the execution of resident hypertext documents. Thus, the invention can be viewed as providing a hypertext-based operating system, particularly as it relates to a graphic user interface (GUI). In the ensuing discussion, and on the drawings, this aspect of the invention will occasionally be referred to as HTOS (for hypertext operating system).

Although features of conventional, well known PC-based network browsers also appear in connection with the present invention, use of the PC (personal computer) generally requires significant computer literacy. By way of contrast, the telephone/terminal device 100 of the present invention is dedicated to the functions of telephones and network access without complicated user interaction. Full hypertext "browsing" capability is provided with the present invention by utilizing a "native" hypertext markup language upon which to base the GUI.

The PC-based systems load a Web browser on top of an existing GUI, such as that of Microsoft Windows, with which the user thereof must be familiar. The present invention, which uses no such underlying GUI other than the hypertext system itself, requires no such prior knowledge by the user. While PC's use a hypertext markup language only to manipulate information, the present invention extends the use of hypertext markup language as a consistent and integrated basis for constructing an operating system with its own "native" GUI.

Screen phones use proprietary infrastructures for communications, and use proprietary languages to upload screen definitions. The present invention uses an open hypertext language, such as HTML, as a consistent method for constructing its own GUI. It further avoids the need for proprietary infrastructures, as it is capable of communicating with an infrastructure such as the Internet, using the widely-known HTTP protocol to transfer HTML files. Further, in the present invention, the hypertext language used for data network interaction is the same hypertext language used to construct its GUI. The hypertext language is the "native" language of the telephone/terminal device 100 of the present invention.

Figure 3:
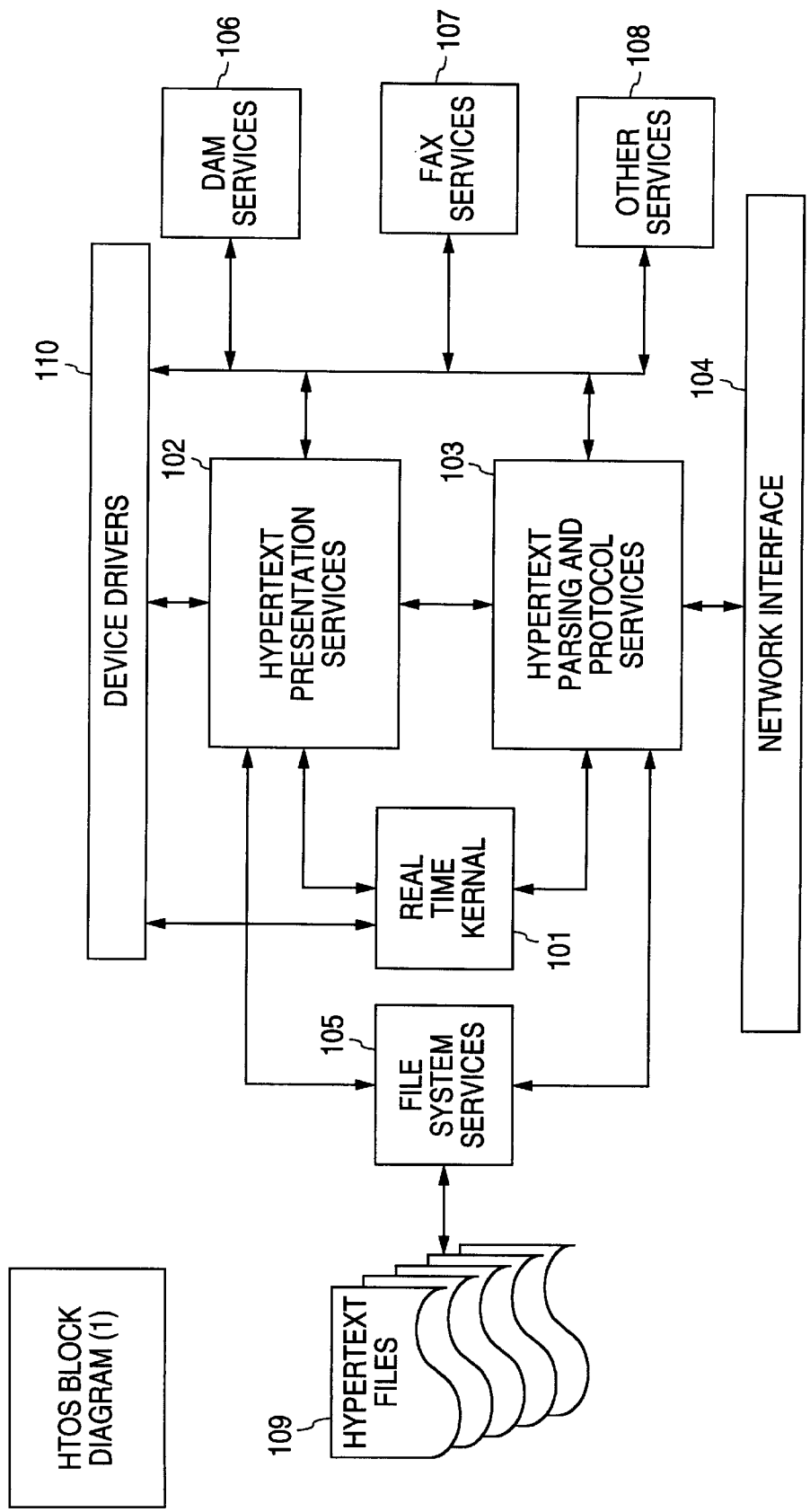
FIG. 3 is a block diagram of a hypertext-based operating system according to the present invention.

FIG. 3 shows the main blocks, or modules, within the operating system provided in accordance with the principles of the present invention. It contains a small Real Time Kernel 101 used only for the purpose of internal scheduling and resource management. The Real Time Kernel 101 is used to concurrently run the main modules shown in FIG. 3, including the Hypertext Parsing and Protocol Services module 103, and the Hypertext Presentation Services module 102.

The Hypertext Parsing and Protocol Services module 103 is responsible for retrieving hypertext documents from the network through the Network Interface module 104, or from internal memory 109 through the File System Services module 105. It is further responsible for parsing (i.e. interpreting) the hypertext document into an intermediate form known to the Hypertext Presentation Services module 102. The data in its intermediate form can either be passed directly to the Hypertext Presentation Services module 102, or be passed to the File System Services module 105. Implementations for modules 103, 104 and 105 can be found in the WWW source library description. This publication, available only on the Internet, is an effort to achieve interoperability among the different browsers by supplying a free source code library that implements some of the basic functionality. Its address is http://www.w3.org/hypertext/WWW/Library/.

Particular reference is made to material available as follows: Henrik Frystyk, libwww@w3.org, November 1995. In the chapters titled "Overview of the Core" and "Basic Design Model", the modules labelled Protocol and Format manager are the parallel of block 103. The block labelled Access Manager is the parallel of block 104. The block labelled File Cache Manager is the parallel of block 105. The library does not include the parallel of block 102 since the presentation services are GUI specific. Further information is available in Henrik Frystyk, Hacon Lie (CERN), "Towards a Uniform Library of Common Code—A presentation of the CERN World-Wide Web Library", 2 WWW Conference '94, Chicago, May 25–27, sponsored by the University of Illinois at Urbana-Champaign. All these publications are hereby incorporated by reference. It is assumed that when implementing a browser, the implementor would use hooks present in the Format Manager and create a GUI specific presentation module.

The Hypertext Presentation Services module 102 is responsible for translating hypertext documents from their intermediate form to a presentable form on the display. It is also responsible for detecting the user's interaction with the displayed documents in terms of detecting a selection of a hyperlink, and consequently triggering the retrieval of the associated document through the Hypertext Parsing and Protocol Services module 103. The display interactions are done through the device drivers 110.

In order to retrieve remote hypertext documents, the Hypertext Parsing and Protocol Services module 103 sends a request to the appropriate remote server computer at a "node" on the Internet which, in turn, sends an existing document, or composes one on the fly and sends it. As to the composing functionality, a well known mechanism called CGI (Common Gateway Interface) allows a browser to request a server to execute a program/script residing on the server's machine (as opposed to requesting the server to send a document residing on the machine). This program/script is specified with the hyperlink. Often, the program/script performs some action, and then creates a hyperlinked file on the fly with the results.

In a way, this operational aspect of the invention can serve as a local internal server for hypertext documents it supports. This can be the mechanism used by the invention to support different system services. For example, in order to use the DAM (digital answering machine) Services 106, fax services 107, or other services 108, a hypertext document may include a hyperlink into the operating system that refers to the required services.

Figure 4:
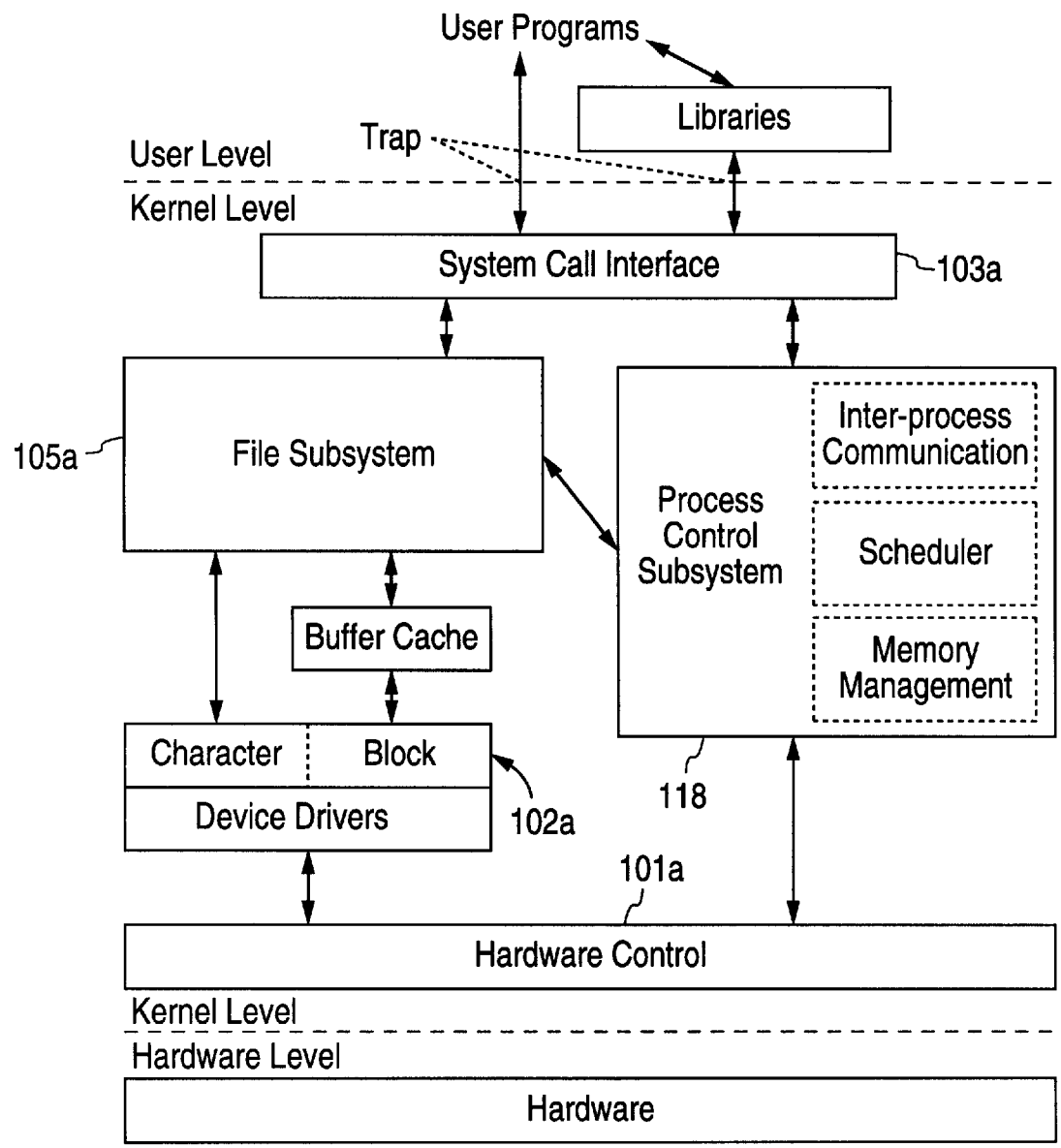
FIG. 4 is a block diagram of a conventional operating system.

As opposed to the structure of the operating system arranged in accordance with the present invention as described with reference to FIG. 3, FIG. 4 depicts a block diagram of the UNIX operating system which represents a block diagram of a prior art operating system intended to be a parallel depiction of FIG. 3. The parallelism is emphasized by use of the same number in both drawings for corresponding, but not the same, modules. Specifically, the prior art operating system and the present invention include a hardware control module 101*a* and 101, respectively, a device driver module 102*a* and 102 and a file system module 105*a* and 105. The main module in any prior art operating system is a process control module, or subsystem. The Process Control Subsystem 118 is responsible for allowing application programs to be executed, to share system resources and, often, to coexist. In accordance with a particularly significant contribution of the present invention, this module 118 is not required in the telephone/terminal device 100, as there are no application programs that need to be executed. Applications supported by the present invention are embodied as a sequence of hypertext documents with hyperlinks to each other, as well as to resident resources and services. The system call interface 103*a* is used within prior art operating systems to allow application programs to execute operating system subprograms that provide required system services. Since programs supported by the present invention are, in effect, simply hypertext documents, the function of such a system call interface of the prior art is accomplished with the present invention by embedding hyperlinks to operating system services within the hypertext documents "executed" as applications using this operating system. More details on the prior art depicted in FIG. 4 can be found in M. Bach, "Design of the UNIX Operating System", ISBN 0132017997, Prentice Hall.

Figure 5:
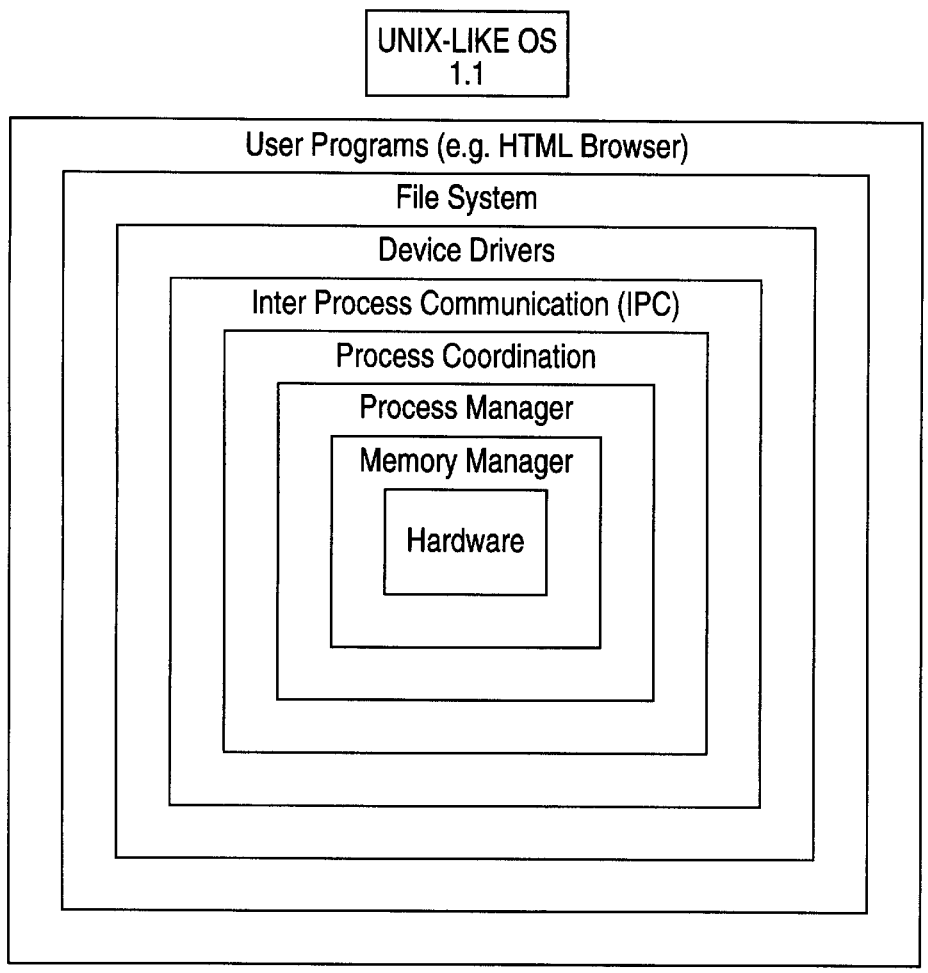
FIG. 5 is a depiction of a conventional operating system shown in the form of software layers.

FIG. 5 is another view of a conventional operating system based on its software layers. At the core lie the code implementing services such as memory management (performed by a memory manager layer) and process management (performed by process manager, process coordination and interprocess communication layers). These are needed to allow program code to execute while switching back and forth between different programs or between a single program and the operating system, which is in itself a program executing on the same processor. A device drivers layer and a file system layer allow application programs to access different I/O peripherals including a display, a disk, etc. User programs, such as a browser, can then be executed on this prior art OS.

Figure 6:
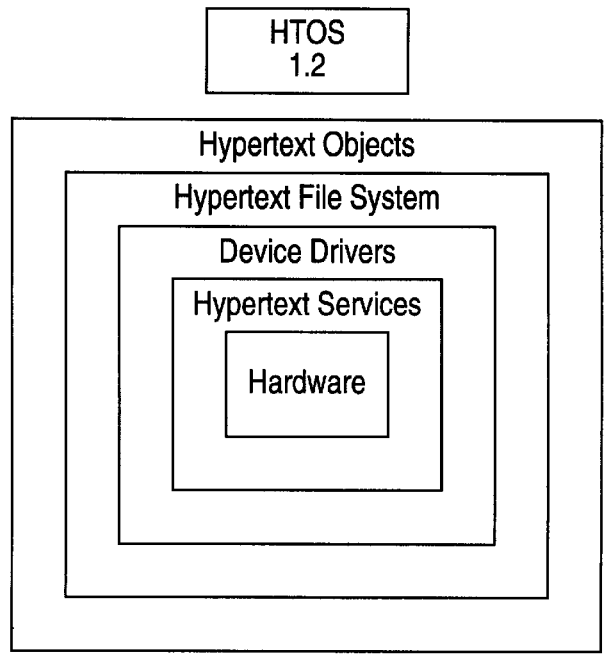
FIG. 6 is a depiction of an operating system according to the invention shown in the form of software layers.

FIG. 6 describes the present invention from a similar, layered approach as that used in FIG. 5. As is readily apparent from FIG. 6, the operating system of the invention includes no means for managing processes or memory. This is because the application "programs" are composed of hypertext documents, which are in fact data and not sets of instructions to be executed on the same processor as the operating system program itself. The hypertext services layer is responsible solely for the parsing, display and interaction involving hypertext documents. The device drivers layer and file system layer allow hypertext documents to include hyperlinks that point to local resources such as the disk. (Note that even remote hypertext documents may include a hyperlink to a local resource within an instance of HTOS. One example is a hyperlinked request by the remote document to "play a locally available tune". In such a case, a part of the HTOS that is capable of playing tunes would play a tune that is locally available in memory.)

Figures 7, 8:
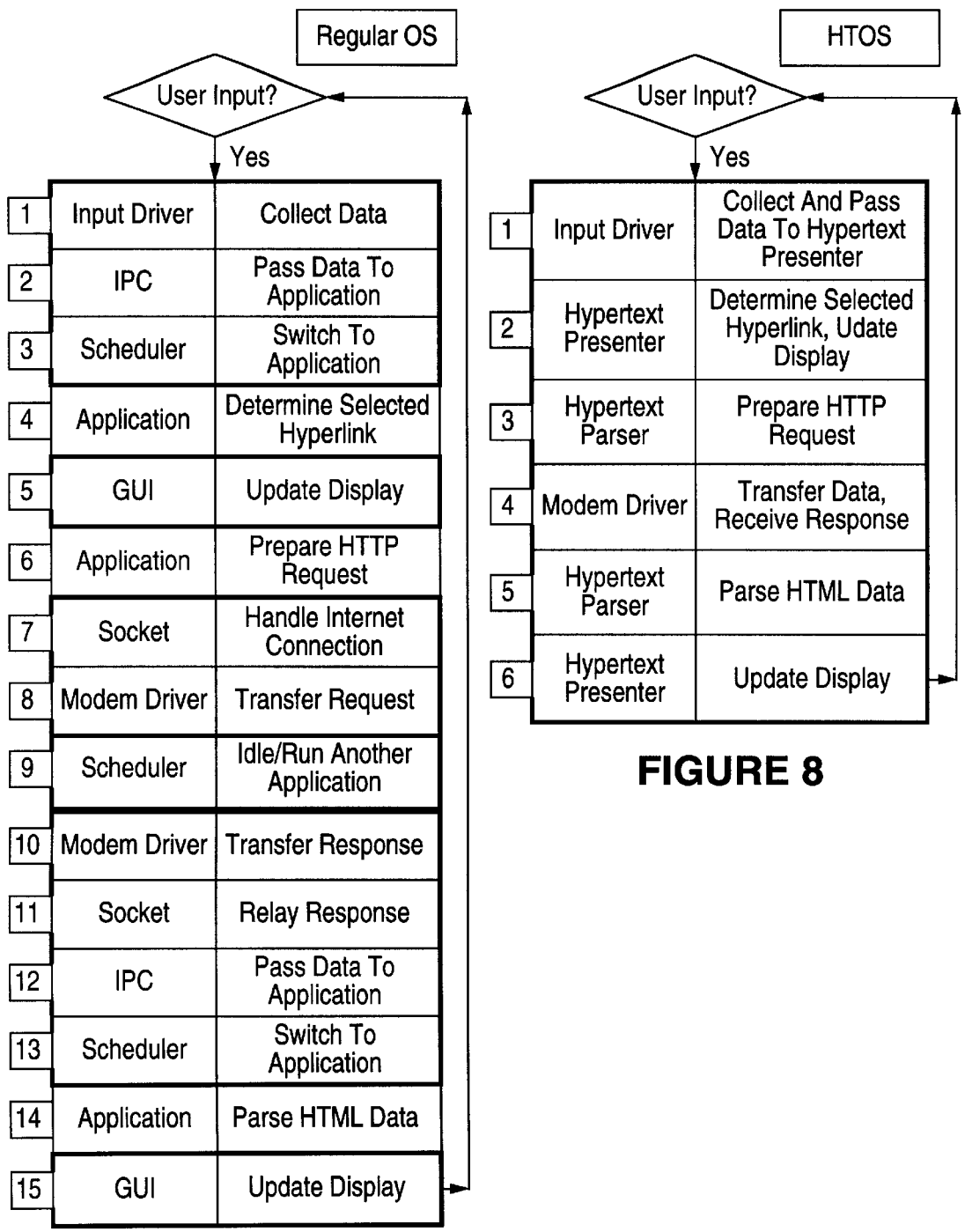
FIG. 7 is a sequence of events implemented by the conventional operating system depicted in FIGS. 4 and 5.
FIG. 8 is a sequence of events implemented by an operating system according to the invention depicted in FIGS. 3 and 6.

FIG. 7 shows an exemplary sequence of events that transpires when a hypertext browser application is executed on top of a prior art operating system. Given a hypertext document displayed to the user, the browser program is suspended while waiting for the user to select a hyperlink. In the meantime, it is possible that other applications are loaded and executed. The segments with a highlighted, heavier border on this drawing indicate steps that are internal to the operating system, while other segments reflect steps executed by the browser program which are not part of the operating system.

Once the user selects a hyperlink, (event 1) the relevant driver within the OS corresponding to the user's input device (e.g. mouse, keyboard, etc.) gathers the data from the input device. Next, (event 2) the Inter Process Communications (IPC) module needs to pass the data to the process corresponding to the browser program. The scheduler (event 3) needs to reactivate this process, possibly moving the currently executing process into a dormant state. The browser application program (event 4) now becomes active and can read the data corresponding to the hyperlink selected by the user, and to determine the corresponding anchor. To change the graphic representation of the hyperlink in order to acknowledge the selection to the user, the browser application must call the GUI services (event 5) which are executed and may update the display. Next, the application program (event 6) prepares an HTTP request that needs to be sent to the remote server in charge of the document pointed to by the hyperlink selected by the user. This request is sent through the operating system. The socket service (discussed below) in the OS (event 7) is invoked to generate a connection with the remote node on the Internet. This, in turn, invokes the modem driver (event 8) to physically transfer the request. At this stage the application must wait for a response and, therefore, the scheduler (event 9) may transfer the browser application into a dormant state, and possibly wake up another dormant application waiting to execute.

Socket services is a software program (library) that provides a high-level interface to Internet access. This is done by providing an API (Application Interface, i.e. a set of functions) that implement some of the required functionality. This program uses the drivers to access the actual hardware that is used to connect with the Internet. The set of functions included in this program is standardized, so that people writing application programs that need to access the Internet can insert references to them. In FIG. 4, this program is part of the "libraries". It is also part of the depiction shown in FIG. 5 even though it is not explicitly shown.

When a response is received from the remote node in the Internet, the modem driver in the OS (event 10) is invoked. It transfers the data to the socket layer services (event 11) which, in turn, triggers the IPC module (event 12) in order to make the data available to the application. Next, the scheduler (event 13) is executed to wake up the browser application which resumes its executed state. The application (event 14) can then access the data received, which is in the form of a new hypertext document. This document is parsed by the application, using the GUI services (event 15) to display the document to the user. When done, the application becomes dormant again, returning to the initial stage (event 1) upon a new user input.

In contrast, FIG. 8 shows how a corresponding sequence of events is carried out when the invention is employed. Once the user is ready to select a hyperlink, the relevant driver corresponding to the user's input device (normally a touch screen) is invoked (event 1). It passes the data directly to the Hypertext Presentation Services module (event 2). This module provides the required visual feedback to the user on the display, and prepares the required HTTP request (event 3) which it sends through the modem driver (event 4) to the remote Internet server. When the response is received, the modem driver (event 4) transfers the data, which is a hypertext document, to the Hypertext Parsing Services module (event 5), which translates the data into an intermediate form accessible to the Hypertext Presentation Services module (event 6) which displays the new document to the user. When done, the system awaits the next user input, in response to which this process is restarted.

Figure 9:
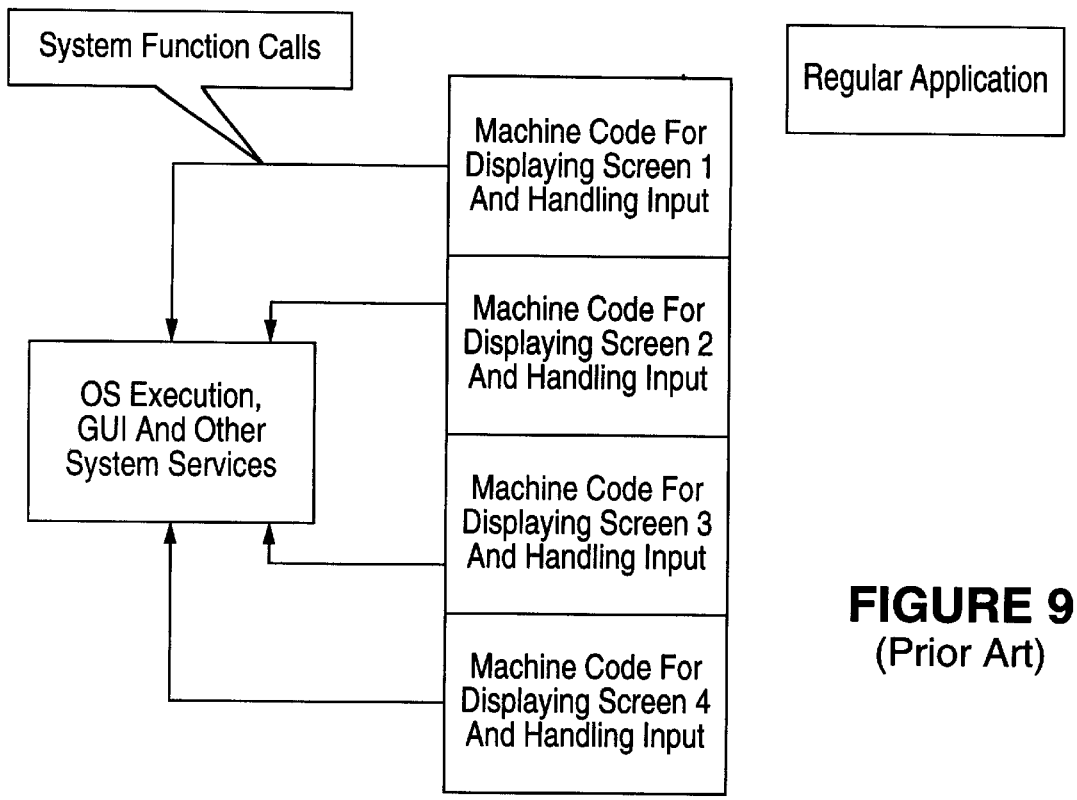
FIG. 9 is a block diagram depiction of how an application program is executed by a conventional operating system.
Figure 10:
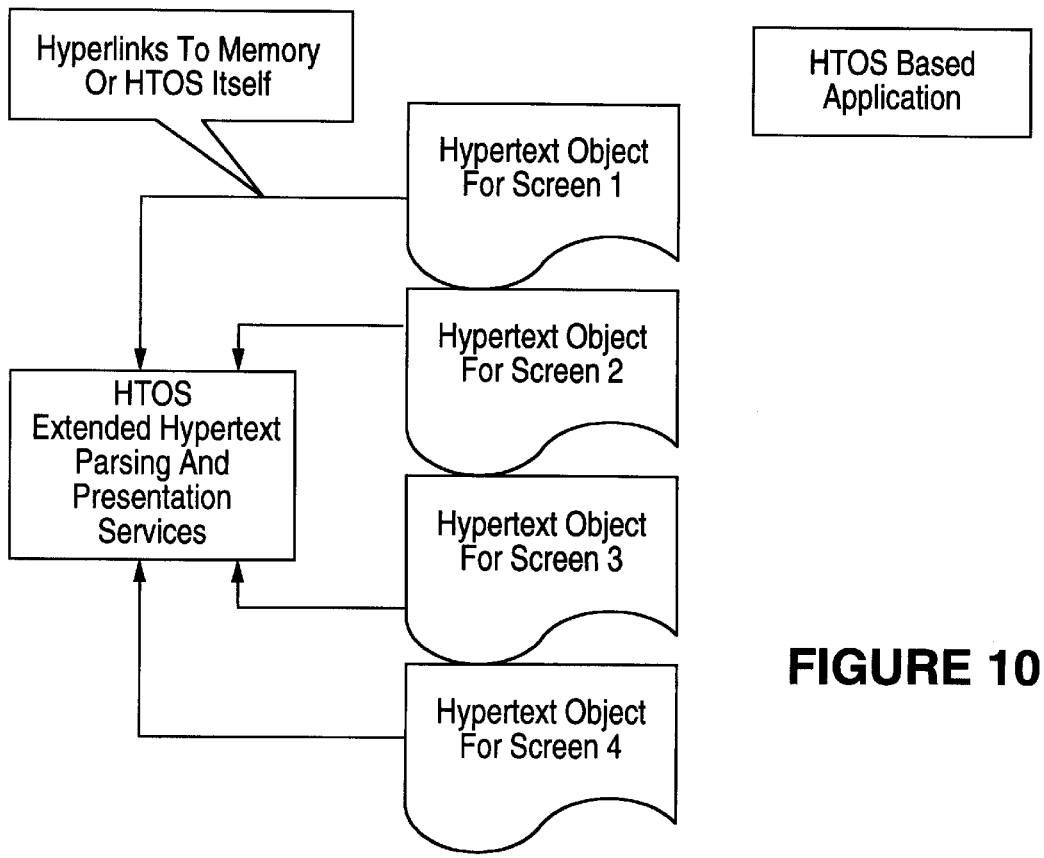
FIG. 10 is a block diagram depiction of how an application is executed with the present invention.

FIGS. 9 and 10 show a sample program in which the user can interact with four different screens, moving from one to the other responsive to the input provided by the user. These different screens are referred to as screens 1 through 4. They may correspond, for example, to a main screen for presenting three options, and a different screen for each of these three options (e.g. a screen for viewing the user's phone book, a screen for viewing the user's appointment book, a screen for entering new data, and a main screen allowing the user to choose one of the above-mentioned screens).

FIG. 9 describes the way such a program would be executed on top of a generic prior art OS. This program would be implemented through a programming language, and translated into machine code executable by the system processor. Each screen could be identified with a subprogram, a set of instructions that would determine the user input in the context of the given screen, along with the set of instructions required to carry out the user request, either by jumping to the code responsible for the interaction with a different screen, or by interacting with system resources to effect the display, search through a file in the file system, etc. The interaction with the system resources is done through the OS call interface, normally by jumping to a subprogram within the operating system. When done, and when appropriate, the operating system program will jump back to this subprogram, after restoring the exact same state which existed before the operating system subprogram was called.

In contrast, FIG. 10 describes how the present invention implements an application with similar capabilities to the one shown in FIG. 9, but as used in conjunction with HTOS. As opposed to the prior art, this application is no longer written in a programming language, nor is it translated to machine instructions executable on the system processor. Every screen in the above application is represented by a hypertext document. Jumping from one screen to another is accomplished by including the appropriate hyperlinks in these documents which point from one to the other. Using system resources is accomplished by including hyperlinks into HTOS referring to the required services.

Figure 11:
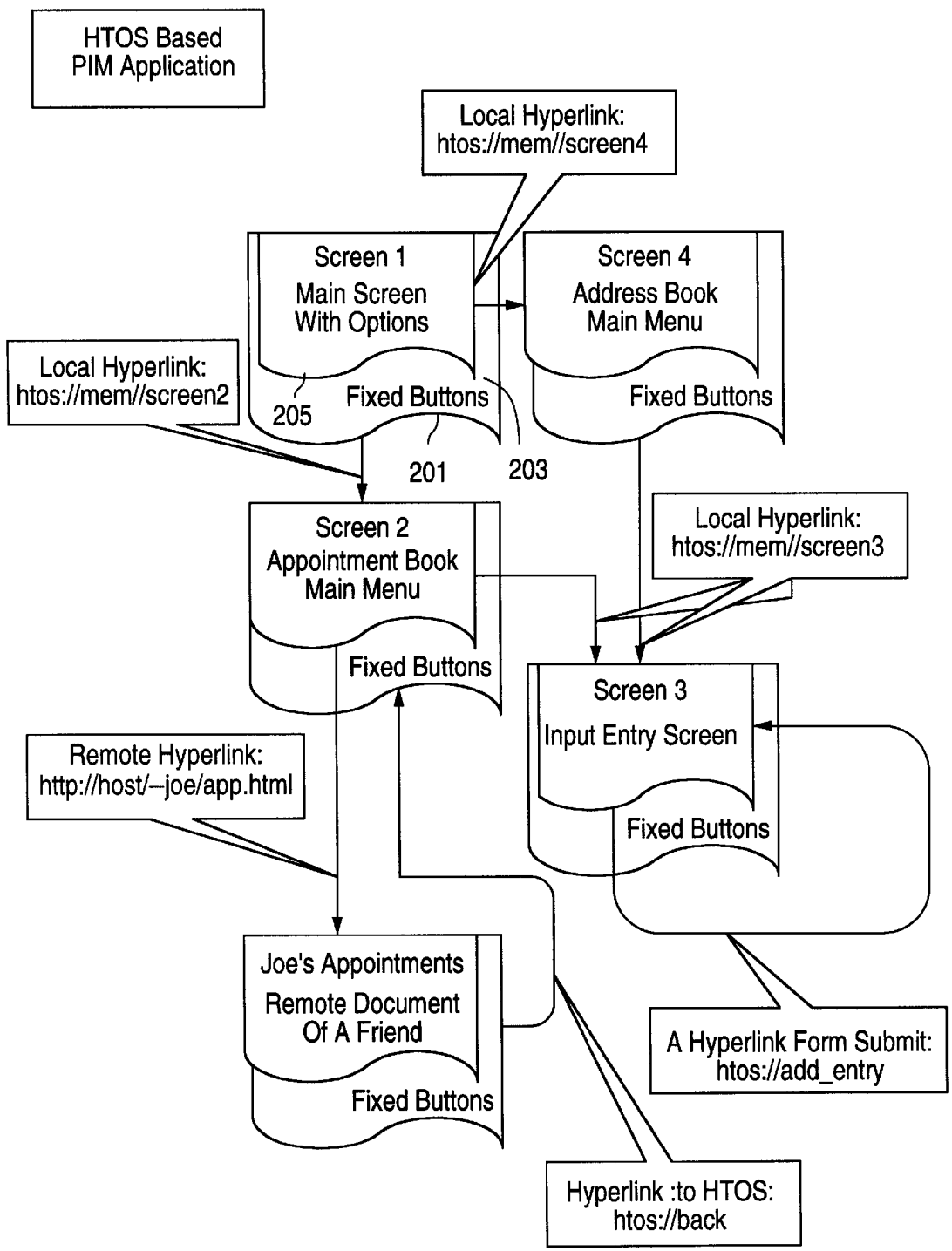
FIG. 11 is a more detailed depiction of FIG. 10.

FIG. 11 represents a more detailed view of how such an application could be formed in conjunction with the operating system of the present invention. Initially, two hypertext documents are parsed and displayed. The first, 201, presents the user with a set of hyperlink buttons 203 at the bottom of the screen (each button being an embodiment of a hyperlink). The second hypertext document, 205, creates an overlay with some options for the user. For example, the user can select to interact with an address book, which is implemented as a hyperlink (htos://mem/screen4) that would invoke screen 4; or an option to interact with the appointment book, which is implemented as a hyperlink (htos://mem/screen2) that would invoke screen 2. Assuming screen 4 is invoked, in effect the appropriate hypertext document is retrieved (from local memory in this case, as /mem/ was used rather than a remote locator), parsed and presented to the user. This screen may contain an option to enter a new address to the address book, which in effect is a hyperlink to screen 3 (htos://mem/screen3). This hypertext document is a form allowing text entry (htos:/add_entry). As opposed to sending the entered text to a remote server, this data is sent to the OS of the present invention which functions as a local server and acts upon the data. From screen 2, the appointment book, it is possible to include a hyperlink which points to a remote hypertext document (as opposed to local memory). In the example, the appointment book includes a link to Joe's appointment book residing remotely (using the hyperlink http://host/~joe/app.html). In this case, when the user selects this option, the remote document will be retrieved, parsed and displayed. One of the fixed buttons available to the user can be used to return to the previous screen. This button is a hyperlink to the "back" system service, which provides a hyperlink to the previous location visited (htos://back).

Although the invention has been illustrated and described in detail in the drawings and foregoing description, the same is to be considered as illustrative and not restrictive in character—it being understood that only preferred embodiments have been shown and described. Various modifications thereof would be readily apparent to anyone with ordinary skill in the art. For example, the term "graphical user interface" has been used above mostly to denote a display, i.e. visual, type of interface. However, the GUI service which is part of the OS provided by the invention can be a multimedia interface, not restricted to the visual. All such modifications are intended to fall within the spirit and scope of the invention, as defined by the following claims.

What is claimed is:

1. A telephone/terminal device comprising:
    a graphics display screen;
    a memory system at least a portion of which comprises non-volatile memory, a hypertext markup language interpreter being stored within the memory system, and one or more resident hypertext documents being stored within the memory system;
    a data communications interface;
    a voice communications interface;
    an input device for interacting with hyperlinks displayed on the display screen; and
    a processor for operating and controlling the display screen, the input device, the memory system, the data communications interface, the voice communications interface, and for executing the hypertext markup-language interpreter such that when operated upon by the hypertext markup language interpreter the resident hypertext documents provide a multimedia user interface functionality for the telephone/terminal device.

2. A telephone/terminal device according to claim 1, wherein:
    the hypertext markup language is HTML.

3. A telephone/terminal device according to claim 1, wherein:
    said voice communications interface includes a telephone handset.

4. A telephone/terminal device according to claim 1, wherein:
    said voice communications interface includes a speakerphone.

5. A telephone/terminal device according to claim 1, further comprising:
    a protocol hierarchy for interacting with a data communications network.

6. A telephone/terminal device according to claim 5, wherein:
    the protocol hierarchy is TCP/IP.

7. A telephone/terminal device according to claim 1, wherein:
    said input device includes voice recognition.

8. A telephone/terminal device according to claim 1, wherein:
    said input device includes handwriting recognition.

9. A telephone/terminal device coupled to a communications network having nodes at each of which a host computer provides access to data stored therein, comprising:
    a hypertext-based operating system for executing resident hypertext documents; and
    a processor responsive to said hypertext-based operating system and said resident hypertext documents for executing said documents to navigate the network.

10. A telephone/terminal device comprising:
    a graphics display screen;
    a memory system at least a portion of which comprises non-volatile memory, a hypertext markup language interpreter being stored within the memory system, and one or more resident hypertext documents being stored within the memory system;
    a data communications interface;
    a voice communications interface;
    an input device for interacting with hyperlinks displayed on the display screen; and
    a processor for operating and controlling the display screen, the input device, the memory system, the data communications interface, the voice communications interface, and for executing the hypertext markup-language interpreter such that when operated upon by the hypertext markup language interpreter the resident hypertext documents provide an operating system for the telephone/terminal device.

11. A telephone/terminal device according to claim 10, further comprising a graphical user interface native to said operating system.

* * * * *